US00RE38693E

(19) United States
(12) Reissued Patent
Donald

(10) Patent Number: US RE38,693 E
(45) Date of Reissued Patent: Feb. 1, 2005

(54) SLIDING DOOR LATCH WITH SELF-RETRACTING FINGER PULL

(75) Inventor: Joseph G. Donald, El Dorado Hills, CA (US)

(73) Assignee: Newfrey LLC, Newark, DE (US)

(21) Appl. No.: 09/680,816

(22) Filed: Oct. 5, 2000

Related U.S. Patent Documents

Reissue of:
(64) Patent No.: 5,816,629
Issued: Oct. 6, 1998
Appl. No.: 08/585,430
Filed: Jan. 11, 1996

U.S. Applications:
(63) Continuation-in-part of application No. 08/396,557, filed on Mar. 1, 1995, now Pat. No. 5,529,351, which is a continuation-in-part of application No. 08/210,694, filed on Mar. 17, 1994, now Pat. No. 5,452,928.

(51) Int. Cl.[7] ..... E05B 15/00
(52) U.S. Cl. ..... 292/254; 292/191; 292/169.13
(58) Field of Search ..... 292/191, 153, 292/254, 341.17, 169.13, 169.14, 169.16

(56) References Cited

U.S. PATENT DOCUMENTS 195,270 A * 9/1877 Hall et al.
205,041 A * 6/1878 Brocksieper
2,230,096 A * 1/1941 Voight ..... 292/169
2,793,894 A * 5/1957 Modes ..... 292/128
3,600,021 A * 8/1971 Hawkins ..... 292/167
4,566,725 A * 1/1986 Klein ..... 292/191
5,452,928 A * 9/1995 Donald ..... 292/254
5,529,351 A * 6/1996 Donald ..... 292/254

* cited by examiner

*Primary Examiner*—Jerry Redman
(74) *Attorney, Agent, or Firm*—Foley & Lardner LLP

(57) ABSTRACT

A sliding door deadbolt assembly containing a self-retracting finger pull mechanism is described. Provided is a latch assembly having a self-latching deadbolt assembly for mounting to a sliding door and latching with a strike plate mounted in a door frame and a self-retracting finger pull mechanism for accessing the sliding door from within a surrounding framework. Specified are a housing for fitting within the sliding door, a self-latching deadbolt for engaging with the strike plate means, a mechanism for sliding the self-latching deadbolt between a nonengaging position and an engaging position for latching with the strike plate, and a self-retracting finger pull mechanism comprising a finger pull member having first and second ends, a finger grasping recess proximate the finger pull member first end, a self-retracting finger pull mechanism within the self-latching deadbolt for providing access to the finger pull member and for retracting the finger pull member, and a finger pull attachment located proximate the finger pull member second end for providing a hinged connection to the self-retracting finger pull mechanism.

24 Claims, 7 Drawing Sheets

SLIDING DOOR LATCH WITH SELF-RETRACTING FINGER PULL

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation-in-part of copending application Ser. No. 08/396,557 filed on Mar. 1, 1995 *now U.S. Pat. No. 5,529,351* which is a continuation-in-part of *08/210,694,* issued U.S. Pat. No. 5,452,928 filed on Mar. 17, [1995] *1994*.

BACKGROUND OF THE INVENTION

1. Field of the Invention

Disclosed is a self-latching mechanism for a sliding door that includes deadbolt access means or a self-retracting finger pull. More specifically, an improved latch device or self-latching deadbolt assembly for a sliding door is provided that includes, in addition to the self-retracting finger pull, a deadbolt having a single lever adapted with resilient means for engaging a strike plate. With the aid of guiding means, the latching mechanism of the self-latching deadbolt assembly functions to engage the strike plate both when the deadbolt is extended before or after closing the door. To access sliding door from within the surrounding sliding door framework, the self-retracting finger pull is fitted into the exposed end of the deadbolt.

2. Description of the Background Art

Door latches for pocket or sliding doors exist in various forms. Many of these latching means have some form of sliding deadbolt that extends, when the door is in a closed position, from within the door and into a receiving strike plate in the door frame. However, these existing latches require an additional means for accessing the sliding door from within the surrounding framework. The subject invention combines the sliding door deadbolt assembly with a finger pull access mechanism, thereby overcoming previous space, appearance, and structural limitations inherent in having both a deadbolt and an access means within the sliding door.

A type of handleless cabinet latch that is found on specific styles of cabinets to create a handle-free appearance is comprised of a mechanism having an outer frame with an internal piston. The internal piston has a magnet fixed to one end that binds a metallic plate fastened to the inside of the cabinet door thereby holding the door in a closed position when the plunger is retracted within its outer frame. The cabinet door is pushed slightly and the piston is released from within its outer frame and extends to a position in which the door is sufficiently ajar for a user to grasp the door edge as a handle for completely opening the cabinet. The internal mechanism for the piston-frame apparatus comprises a sloped track within the piston in which one end of a guide pin (the other end affixed to the outer frame) travels to permit the closed and open positions as the only options in a cyclic path that lead from closed to open or open to closed.

Specifically concerning issued patents, U.S. Pat. No. 4,566,725 relates a deadlock mechanism for a sliding door that comprises a pair of levers, each with an ear and a projecting lug. No ability for self-latching is present in this device. As the deadbolt is thrown into the strike plate, the pair of levels extend and lock behind the edges of the strike plate. Should the deadbolt be extended before the door is closed, the projecting levers prevent the deadbolt from entering the strike plate.

Further, disclosed in U.S. Pat. No. 5,452,928, issued to the inventor of the subject invention, is a sliding door self-latching apparatus that includes, except for the self-retracting finger pull mechanism, many of the features of the subject invention. However, a limitation that is found in the '928 invention is that since the sliding door when open is completely within its surrounding frame and within the wall a separate handle or finger pull is need to withdraw the door from its compartment. The subject invention overcomes this limitation by providing an integrated deadbolt-finger pull device for accessing the sliding door.

SUMMARY OF THE INVENTION

An object of the present invention is to disclose an improved latching mechanism having a finger access means for a sliding door.

Another object of the present invention is to provide an improved sliding door latch that repeatedly, reliably, and securely holds a sliding door closed against a strike plate mounted in a door frame and provides an integrated handle or finger access means for accessing the door.

A further object of the present invention is to disclose an improved simple self-latching pocket door mechanism having a self-retracting finger pull that utilizes a guided single latching lever that engages with a receiving strike plate mounted in a door frame and a self-retracting finger pull mechanism that cycles between a retracted position which is flush within the end of a deadbolt and an extended position in which a user may employ his or her finger or fingers to exert force upon the door for sliding the door from within its surrounding enclosure within a wall.

Still another object of the present invention is to describe an improved sliding door mechanism having a self-retracting finger pull pivotally secured within a deadbolt and utilizes a single spring associated lever and guiding means also within the deadbolt for engaging and latching with a receiving strike plate mounted in a door frame.

Disclosed is a latch assembly for mounting to a sliding door and engaging with a strike plate means that comprises a housing for fitting within the sliding door, deadbolt means associated with the housing for engaging with the strike plate means, and self-retracting finger pull means associated with the deadbolt means for accessing the sliding door from within a surrounding framework. Also, included is a deadbolt extension means associated with the housing for sliding the deadbolt means between a nonengaging position and an engaging position within the strike plate means.

More specifically, the deadbolt means is usually a self-latching deadbolt means and the self-retracting finger pull means comprises a finger pull member having first and second ends, finger grasping means proximate the finger pull member first end, self-retraction means within the self-latching deadbolt means for providing access to the finger pull member and for retracting the finger pull member, and finger pull attachment means proximate the finger pull member second end for providing a hinged connection to the self-retraction means. Further, the self-retraction means comprises a plunger member fitted within a receiving aperture formed in the self-latching deadbolt means, plunger biasing means coupled between the plunger member and the receiving aperture, a continuous channel formed in the plunger member, and channel following means for locking the plunger in a retracted position and for retaining the plunger in an extended position.

Other objects, advantages, and novel features of the present invention will become apparent from the detailed description that follows, when considered in conjunction with the associated drawings.

DESCRIPTION OF THE PREFERRED EMBODIMENT

Figure 4:
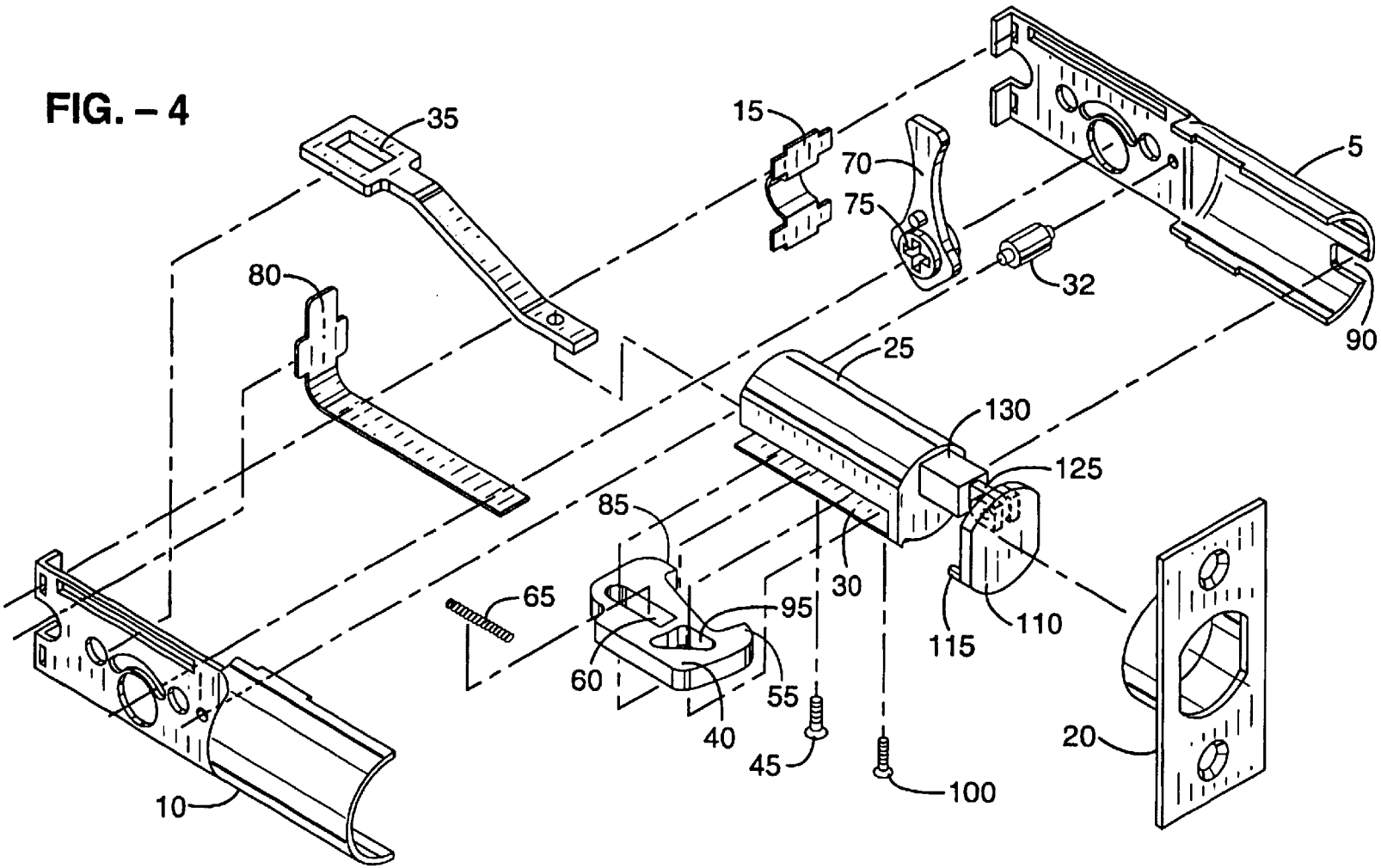
FIG. 4 is an exploded view of the subject invention.
Figure 5:
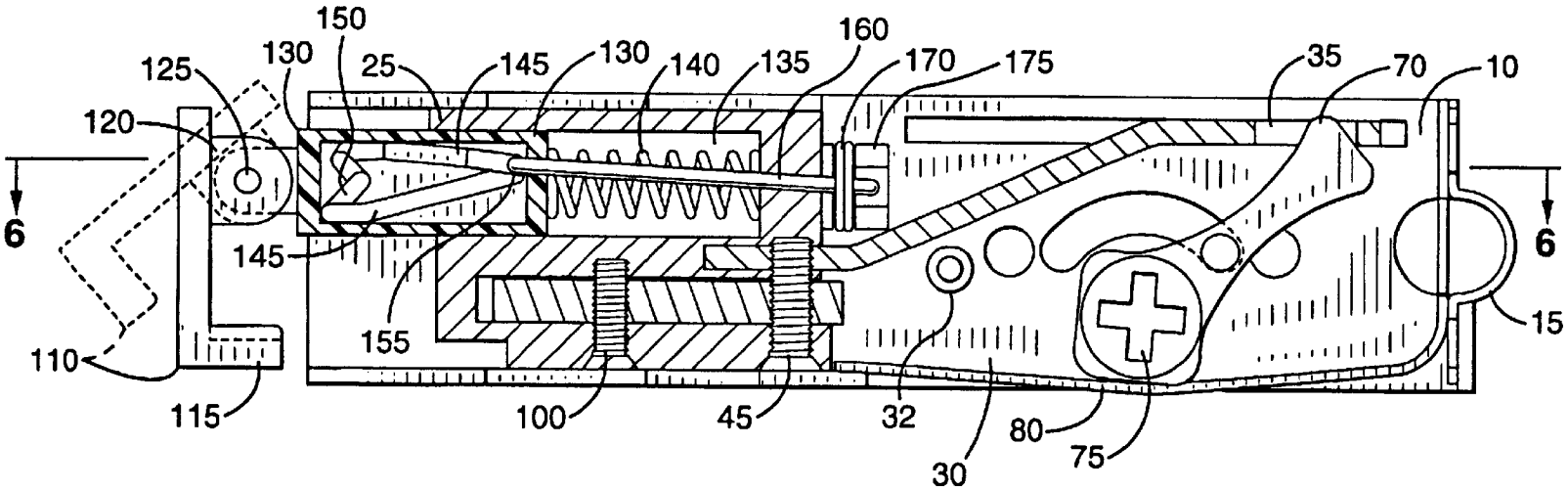
FIG. 5 is a cross-sectional view of the deadbolt assembly, minus the front mounting plate.
Figure 6:
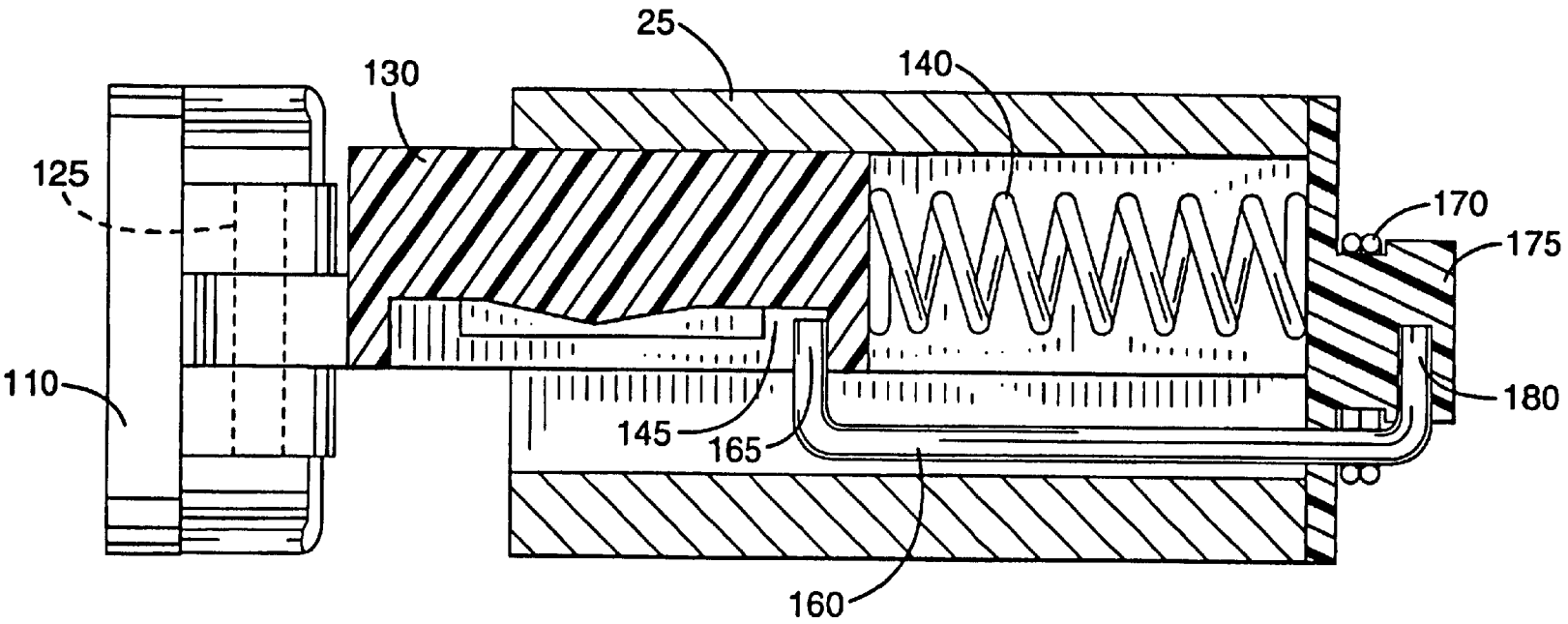
FIG. 6 is a cross sectional view of the deadbolt showing internal components of the self-retracting finger pull means.

Referring now to FIGS. 4–6, there is shown a preferred embodiment of the combination deadbolt means and self-retracting finger pull means for a sliding door. Normally, the subject device is utilized in connection with a typical sliding door. The sliding door itself is mounted in a pocket frame or equivalent structure that fits within a wall. When a user desires to close the door, the door is slid out of the pocket. The subject invention provides the user with a means for accessing the door from within its packet frame and for locking the closed door (slid out of pocket) against a strike plate S mounted on the frame.

The subject invention is described in detail below in terms of incorporating a self-retracting finger pull in to a deadbolt assembly that includes a self-latching deadbolt, however, the subject invention generally comprises the self-retracting finger pull incorporated into any type of deadbolt means. The use of a particular self-latching deadbolt assembly is for illustrative purposes only and is useful for specifically describing one preferred embodiment of the subject invention, but does not limit the use of the self-retracting finger pull means to only deadbolt devices having a self-latching property.

Specifically, the subject apparatus comprises a housing construction from a first side plate 5, a second side plate 10, a back plate 15, and a front mounting plate 20. The four housing components (5, 10, 15, and 20) cooperate to hold or encase the remaining elements of the subject apparatus. Other equivalent configurations are contemplated to be within the realm of this disclosure and include fabrication designs that incorporate combined or additional similar elements.

The housing fits within the sliding door D. The front mounting plate 20 is secured to the door D by standard means such as screws, bolts, and the like. A recessed handle H is utilized to permit the sliding door D to slide within its surrounding framework within the wall.

Figure 1:
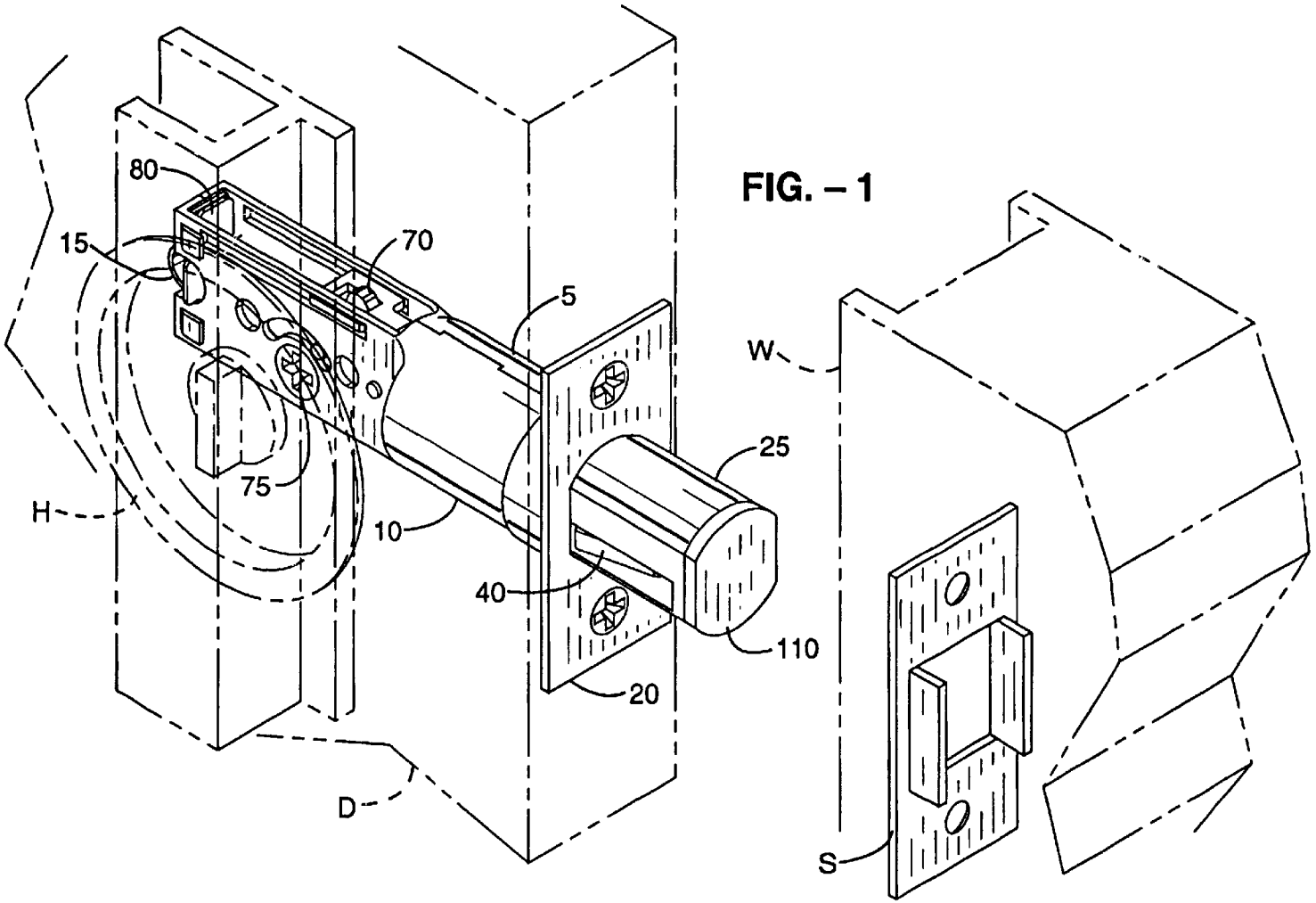
FIG. 1 is a perspective view of the subject invention with the deadbolt in an extended position.
Figure 2A:
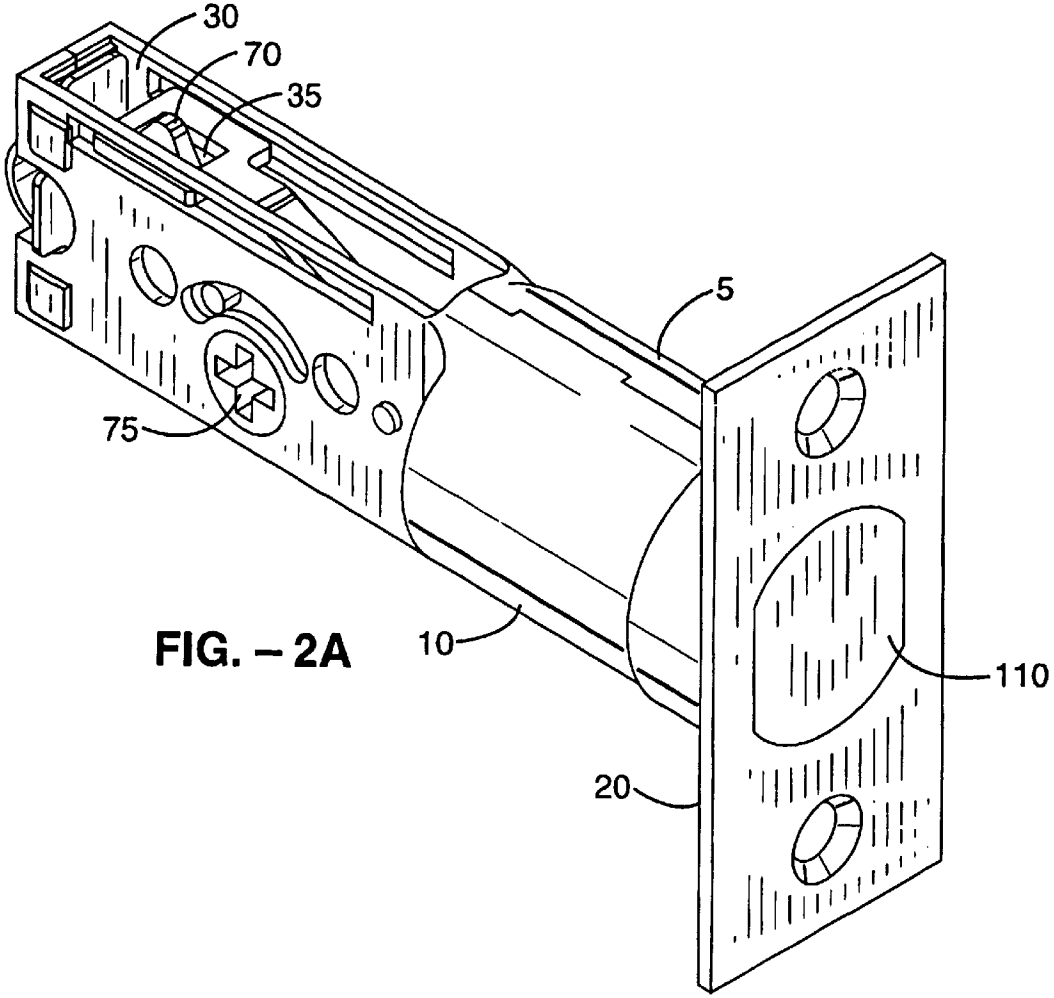
FIG. 2A is a perspective view of the subject invention with the deadbolt in a retracted position and with the finger pull member retracted.
Figure 2B:
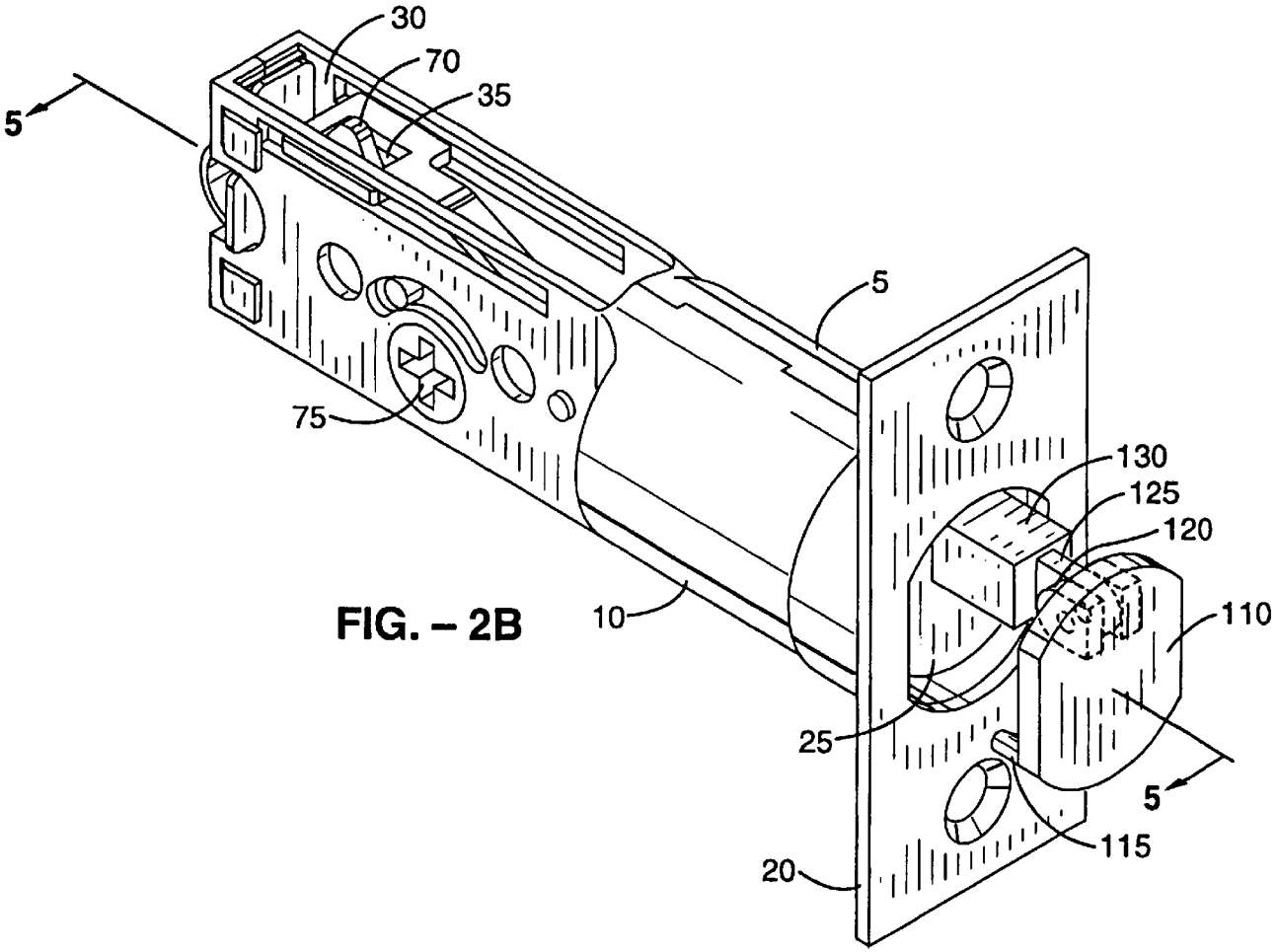
FIG. 2B is a perspective view of the subject invention with the deadbolt in a retracted position and with the finger pull member extended.
Figure 3:
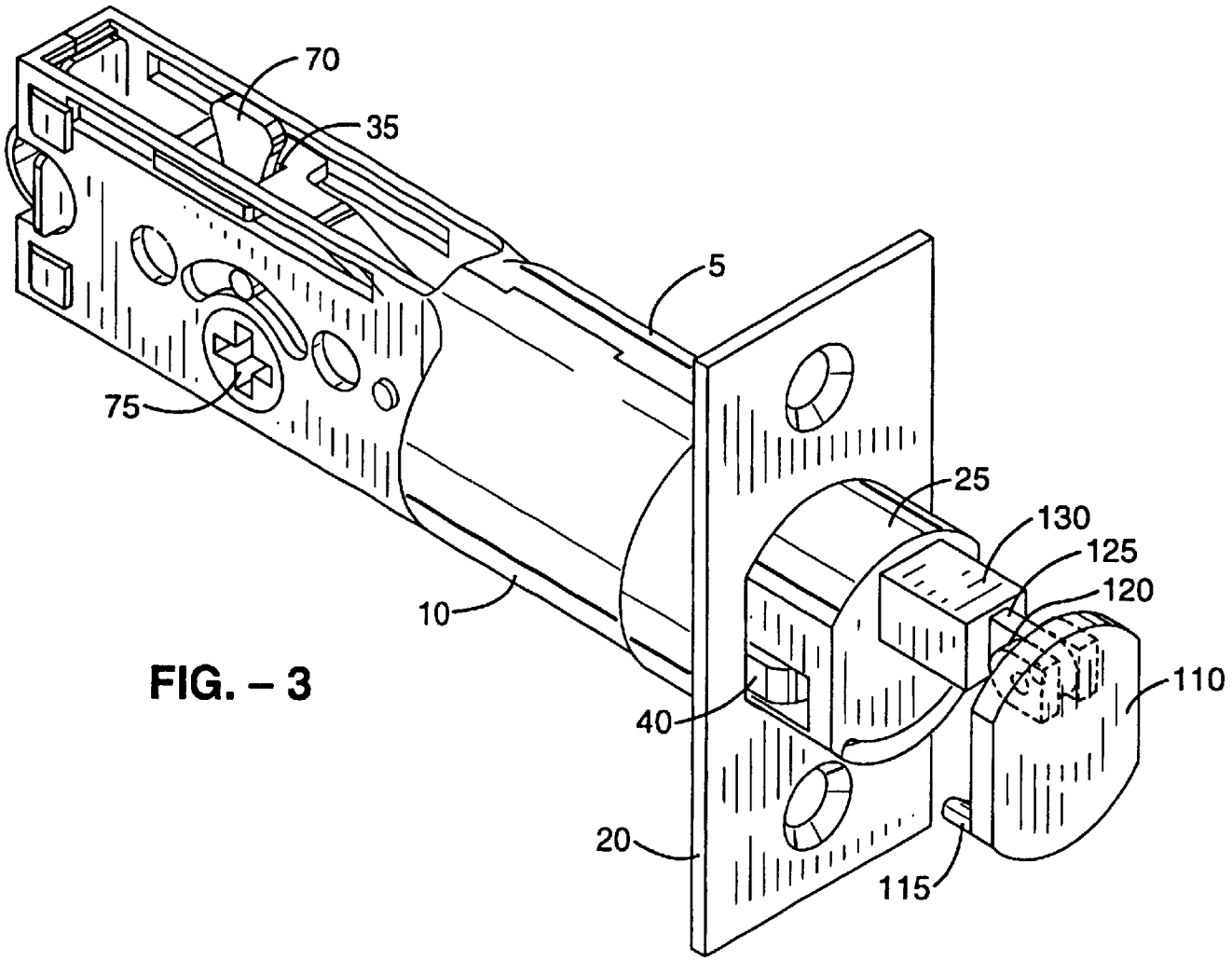
FIG. 3 is a perspective view of the subject invention with the deadbolt in a partially extended position showing the partial pivoting of the lever.

Within the housing and part of a deadbolt assembly is a self-latching deadbolt means that engages the strike plate S. As seen in FIGS. 1–5, a deadbolt 25 is held within the housing. FIG. 1 illustrates the deadbolt 25 in an extended and strike plate S engaging position (the hook means 55 on the lever 40 projects away from the perspective presented in FIG. 1, see below for more details on the hook means 55 and the lever 40). FIGS. 2A and 2B depict the deadbolt 25 in a retracted and strike plate S nonengaging position with the finger pull means either retracted in FIG. 2A or extended in FIG. 2B (see below for details). FIG. 3 depicts the deadbolt 25 in an intermediate or partially extended position. Although other equivalent conformations are possible for the deadbolt 25. FIGS. 4 and 5 show a typical structure for the deadbolt 25. The deadbolt 25 has a first end that enters the strike plate S and a second end that slides within the housing. A longitudinal aperture 30 is formed in the deadbolt 25 and extends to proximate the deadbolt first end. A notch 35, utilizing in sliding the deadbolt 25 between open and closed positions, is formed proximate the deadbolt second end. A deadbolt guide 32 fits within the housing to stabilize the sliding of the deadbolt 25 and securing the two halves of the housing 5 and 10 together.

A lever 40 has a first or head end that extends towards the strike plate S and a second or foot end that is directed away from the strike plate S. When assembled, the lever 40 is fitted within the longitudinal aperture 30 and held by pivoting means that permit pivoting such as a pivot screw or pin 45 mounted in a pivot screw or pin receiving aperture in the deadbolt 25.

Hooking means are associated with the lever first end and are utilized for engaging or hooking within or to the strike plate S when the deadbolt 25 is extended. Preferably, the hooking means comprises a hook 55 formed proximate the lever first end.

A critical element of the present invention is the ability of the device to latch the hook 55 into the strike plate S even if the deadbolt 25 is extended when the sliding door D is closed and the deadbolt 25 inserted into the strike plate S. This hooking or latching ability is provided, in part, by a channel 60 shaped into the lever 40. The channel 60 extends from proximate the lever second end towards the lever first end. Within the channel 60 is a biasing means that is typically a spring 65. The spring 65 fits within the channel 60 and provides a moving pivot point within the channel 60 for the pivot screw or pin 45. If the deadbolt 25 is partially or completely extended when the door is slid shut onto the strike plate S, the hook 55 and associated lever 40 merely compress the spring 65. As the spring 65 compresses and shifts the pivot point, the lever 40 pivots into the longitudinal aperture 30. Since the lever 40 and hook 55 are within the longitudinal aperture 30 the deadbolt 25 passes into the strike plate S and the hook 55 snaps out of the longitudinal aperture 30 and behind the strike plate S to secure or latch the sliding door closed.

Further aiding in the hooking and latching movement of the pivoting lever 40 is a guide means comprising a guide aperture 95 formed in an usually, but necessarily, through the lever 40 and a guide screw or pin 100 that extends through a guide screw or pin receiving aperture in the deadbolt 25 and into and usually, but not necessarily, through the guide aperture 95. The guide screw or pin 100 may merely fit within a guide aperture 95 that partially penetrates the lever 40. Specifically, as seen in FIG. 4, the guide aperture is located within the lever 40 and extends from proximate the first or head end of the lever 40 and proximate or partially beside the channel 60. The interaction between guide screw or pin 100 and the internal shape of the guide aperture 95 dictates the limits of the path available to the lever 40 during the pivoting motion for latching and unlatching with the strike plate S. Although the preferred shape of the guide aperture 95 is generally triangular, other shapes for the guide aperture 95 are considered acceptable if the selected shape of the guide aperture 95 is such that when the deadbolt 25 is extended the lever 40 is directed out of the channel 30 and when the deadbolt 25 is retracted, the shape of the guide aperture 95 aids in the directed movement of the lever 40 into the channel 30. The guide aperture 95 is no restricted to a tightly confined pathway for the guide screw or pin 100, but is fairly spacious. The guide aperture 40 has sufficient space for variability in the exact pivotal position of the lever 40, thus permitting an assisting or aiding action in the pivoting and not a strictly forced direction path. By placing limits of the pivoting motion of the lever 40, the guide means helps to establish a reliable latching motion for the lever 40.

Deadbolt extension means are provided to actuate the sliding of the deadbolt assembly between a nonengaging position and an engaging position for latching the hook 55 with the strike plate S. Preferably, although not exclusively the extension means comprises a cam-lever 70 that fits within the deadbolt notch 35. The cam lever 70 is pivoted within the housing to slide the deadbolt 25 in and out by rotating with suitable means such as a standard handle attached to the coupling region 75. As seen in FIG. 4 and 5, the cam-lever 70 is configured to fit within the deadbolt notch 35 and upon appropriate rotation the cam-lever 70 forces the deadbolt 25 out of and into the housing. In FIGS. 1–3 the top of the cam-lever 70 is seen in three positions partially extending above the deadbolt notch 35. To provide suitable resistance for the deadbolt 25 out and in sliding movement, resilient means, using a spring 80, is supplied.

Generally, the self-retracting finger pull means is a mechanism that supplies a finger pull from within its integrated placement within the surrounding deadbolt 25. The term "self-retracting" indicates that once the finger pull has been accessed by releasing it from within the surrounding deadbolt 25 it is reset to a retracted position either by manually pushing it back into the deadbolt 25 or by the more action of inserting the deadbolt 25 within the strike plate means S. When the end of the deadbolt 25 that contains the finger pull is forced against a back wall of the strike plate the internal mechanism of the finger pull means cycles or "self-retracts" into the retracted position and is held there until the user once again needs it for accessing the sliding door from within its surrounding frame.

Specifically, the self-retracting finger pull means for accessing the sliding door from within the surrounding framework comprises a finger pull member 110 having first and second ends. The finger pull member 110 is configured to fit flush in the end of the deadbolt 25 to provide a generally flat surface which is actually the end of the finger pull adapted deadbolt 25. Included in the self-retracting finger pull means is a finger grasping means 115 that is located proximate the finger pull member 110 first end. Usually the finger grasping means 115 is hooked configuration (see FIG. 6) that is easy to grasp with one or more fingers. Additionally, finger pull attachment means is adapted proximate the finger pull member 110 second end for providing a hinged connection 120 to the self-retraction means at an attachment point 125. Generally, the finger pull attachment means is a traditional hinge formed in the finger pull member 110 second end via the hinged connection 120 to the attachment point 125.

As best seen in FIG. 5, self-retraction means within the deadbolt 25 means is supplied for providing access to the finger pull member 110 and for retracting the finger pull member 110 within the deadbolt 25 means when not needed. More specifically, the self-retraction means comprises several components including a reciprocable plunger member 130 fitted within a receiving aperture 135 formed in the deadbolt means. Further, included in the self-retraction means is a plunger biasing means coupled between the plunger member 130 and an anchoring point within the receiving aperture 135. The biasing means is usually a spring 140 fitted between the second end of the plunger 130 and the end wall of the receiving aperture 135.

Additionally, a continuous channel 145 is formed in the plunger member 130 that directs, in conjunction with a channel following means, a cyclic retracted to extended path of the plunger 130 within the receiving aperture 135 formed in the deadbolt 25. The continuous channel 145 is inclined or sloped between its two outer end extremes and includes locking regions 150 and 155 (for use in conjunction with the channel following means described below) at each of the two outer end extremes.

preferably, the channel following means from locking cyclically or repeatedly the plunger 130 in a retracted position or in an extended position within the receiving aperture 135 comprises an elongated channel following member 160 having first and second ends. The channel following member 160 is usually a thin and somewhat flexible wire that is shaped into a suitable form. Included in the channel following member 160 is a channel following finger 165 formed at the first elongated channel following member end. Additionally, provided is an elongated channel following member biasing means associated with the second elongated channel following member end. The biasing means is generally a spring 170 that allows the channel following means to track within and follow the channel is 145. Anchoring means 175 are included for securing the elongated channel following member biasing means 170 and the second elongated channel following member end 180 proximate the receiving aperture formed in the sliding deadbolt member 25. Generally, the anchoring means 175 is a protrusion around which the biasing spring 170 fastens to hold the second elongated channel following member end 180.

preferably, within the channel and located at approximately its two outer end extremes are locking regions 150 and 155 into which the channel following finger 165 fits to hold the plunger 130 in either its retracted or extended positions. When the plunger 130 is pushed in slightly (just enough to force the channel following finger 165 from within its current locking region 150 or 155 and into the sloped channel 145 between the two extremes 150 and 155) the plunger 130 is freed to travel into its next position (i.e. the retracted position in which the finger 165 is in region 150 and then travels to the extended position in which the finger 165 is in region 155 (FIG. 5 shows the extended position) or the reverse in which the finger travels from the extended position to the retracted position).

Typically, a user employs the subject device by mounting in a suitable sliding door D. Specifically, with the self-latching deadbolt means embodiment, the door D is accessing via pushing in on the self-retracting finger pull which releases the finger pull member 110 for usage by the operator. With the self-latching deadbolt embodiment the operator does not need to be worried about whether or not the deadbolt 25 is extended when the door D is closed onto the strike plate S. In any withdrawn (FIGS. 2A and 2B), partially extended (FIG. 3), or totally extended (FIG. 1) position the deadbolt 25 will pass into the receiving strike plate S opening. The lever 40 and associated hook 55 deflect into the deadbolt longitudinal aperture 30 via the variable pivot point within the lever channel 60, as aided by the limits set by guide means. When the subject finger pull means is extended and the deadbolt 25 enters the strike plate 25, the finger pull means retracts into a flush position and is internal to and integral with the deadbolt 25. When the deadbolt 25 is withdrawn from the strike plate S and back into the housing the lever 40 cooperates with the housing structure, also aided by the guide means, to pivot the lever 40 back into the longitudinal aperture to release the strike plate S. Usually, a nub 85 on the lever 40 catches within a slot 90 in the housing and initiates pivoting of the lever 40 and associated book 55 into the longitudinal aperture 30.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A latch assembly for mounting to a sliding door and engaging with a strike plate means, comprising:

a) housing for fitting within the sliding door;

b) deadbolt means associated with said housing for engaging with the strike plate means; and c) self-retracting finger pull means associated with said deadbolt means for accessing the sliding door from within a surrounding framework, wherein said selfretracting finger pull means comprises:

i) a finger pull member having first and second ends;

ii) finger grasping means proximate said finger pull member first end;

iii) self-retraction means within said deadbolt means for providing access to said finger pull member and for retracting said finger pull member, wherein said self-retraction means comprises:

a plunger member fitted within a receiving aperture formed in said deadbolt means;

plunger biasing means coupled between said plunger member and said receiving aperture;

a continuous channel formed in said plunger member; and channel following means for locking said plunger in a retracted position and for retaining said plunger in an extended position, and iv) finger pull attachment means proximate said finger pull member second end for providing a hinged connection to said self-retraction means.

2. A latch assembly for mounting to a sliding door and engaging with a strike plate means, comprising:

a) a housing for fitting within the sliding door;

b) self-latching deadbolt means associated with said housing for engaging with the strike plate means;

c) self-retracting finger pull means associated with said self-latching deadbolt means for accessing the sliding door from within a surrounding framework, wherein said self-retracting finger pull means comprises:

i) a finger pull member having first and second ends;

ii) finger grasping means proximate said finger pull member first end;

iii) self-retraction means within said self-latching deadbolt means for providing access to said finger pull member and for retracting said finger pull member, wherein said self-retraction means comprises:

a plunger member fitted within a receiving aperture formed in said self-latching deadbolt means;

plunger biasing means coupled between said plunger member and said receiving aperture;

a continuous channel formed in said plunger member; and channel following means for locking said plunger in a retracted position and for retaining said plunger in an extended position; and iv) finger pull attachment means proximate and finger pull member second end for providing a hinged connection to said self-retraction means; and d) deadbolt extension means associated with said housing for sliding said self-latching deadbolt means between a nonengaging position and an engaging position with the strike plate means.

3. A latch assembly for mounting to a sliding door and engaging with a strike plate means, comprising:

a) a housing for fitting within the sliding door;

b) a deadbolt assembly comprising:

i) a sliding deadbolt member having first and second ends;

ii) a lever having first and second ends;

iii) hooking means associated with said lever first end for engaging the strike plate means;

iv) a channel formed within said lever extending from proximate said lever second end towards said lever first end;

v) pivoting means for connecting said lever by said channel to said deadlock member; and vi) biasing means for providing a variable point of pivoting within said channel whereby said pivoting varies from proximate said lever second end toward said lever first end;

c) self-retracting finger pull means associated with said self-latching deadbolt means for accessing the sliding door from within a surrounding framework; wherein said self-retracting finger pull means comprises:

i) a finger pull member having first and second ends;

ii) finger grasping means proximate said finger pull member first end;

iii) self-retraction means within said self-latching deadbolt means for providing access to said finger pull member and for retracting said finger pull member; and iv) finger pull attaching means proximate said finger pull member second end for providing a hinged connection to said self-retraction means; and d) deadbolt extension means for sliding and deadbolt assembly between a nonengaging position and an engaging position with the strike plate means.

4. A latch assembly according to claim 3, wherein said self-retraction means comprises:

a) a plunger member fitted within a receiving aperture formed in said self-latching deadbolt means;

b) plunger biasing means coupled between said plunger member and said receiving aperture;

c) a continuous channel formed in said plunger member; and d) channel following means for locking said plunger in a retracted position and for retaining said plunger in an extended position.

5. A self-latching deadbolt assembly for mounting in a sliding door and engaging with a strike plate means, comprising:

a) a sliding deadbolt member having first and second ends;

b) a lever having first and second ends;

c) hooking means associated with said lever first end for engaging the strike plate means, wherein said hooking means comprises a hook formed in said lever proximate said lever first end;

d) a channel formed within said lever extending from proximate said lever second end towards said lever first end;

e) pivoting means for connecting said lever by said channel to said deadbolt member;

f) biasing means for providing a variable point of pivoting within said channel whereby said pivoting varies from proximate said lever second end toward said lever first end and wherein said biasing means comprises a spring fitted within said channel the cooperates with said pivoting means;

g) guide means for aiding in directing the motion of said lever; and h) self-retracting finger pull means for accessing said sliding door from within a surrounding framework, wherein said self-retracting finger pull means comprises:

i) a finger pull member having first and second ends;

ii) finger grasping means proximate said finger pull member first end;

iii) self-retraction means within said self-latching deadbolt means for providing access to said finger pull member and for retracting said finger pull member; and iv) finger pull attachment means proximate said finger pull member second end for providing a hinged connection to said self-retraction means.

6. A self-latching deadbolt assembly according to claim 5, wherein said self-retracting means comprises:

a) a plunger member fitted within a receiving aperture formed in said self-latching deadbolt means;

b) plunger biasing means coupled between said plunger member and said receiving aperture;

c) a continuous channel formed in said plunger member; and d) channel following means for locking said in a retracted position and for retaining said plunger in an extended position.

7. A latch assembly for mounting to a sliding door and engaging with a strike plate means, comprising:

a) a housing for fitting within the sliding door;

b) self-latching deadbolt means associated with said housing for engaging with the strike plate means comprising a deadbolt assembly comprising:

i) a sliding deadbolt member having first and second ends;

ii) a lever having first and second ends;

iii) hooking means associated with said lever first end for engaging the strike plate means;

iv) a channel formed within said lever extending from proximate said lever second end towards said lever first end;

v) pivoting means for connecting said lever by said channel to said deadbolt member;

vi) biasing means for providing a variable point of pivoting within said channel whereby said pivoting varies from proximate said lever second end toward said lever first end; and vii) guide means for aiding in directing the motion of said lever;

c) deadbolt extension means associated with said housing for sliding said self-latching deadbolt means between a nonengaging position and an engaging position with the strike plate means; and d) self-retracting finger pull means for accessing said sliding door, wherein said self-retracting finger pull means comprises:

i) a finger pull member having first and second ends;

ii) finger grasping means proximate said finger pull member first end;

iii) self-retraction means within said sliding deadbolt member for providing access to said finger pull member and for retracting said finger pull member, and iv) finger pull attachment means proximate said finger pull member second end for providing a hinged connection to said self-retracting means.

8. A self-latching deadbolt assembly according to claim 7, wherein said self-retraction means comprises:

a) a plunger member fitted within a receiving aperture formed in said sliding deadbolt member;

b) plunger biasing means coupled between said plunger member and said receiving aperture;

c) a continuous channel formed in said plunger member; and d) a channel following means for locking said plunger in a retracted position and for retaining said plunger in an extended position.

9. A latch assembly according to claim 8, wherein said channel following means comprises:

a) an elongated channel following member having first and second ends;

b) a channel following finger formed at said first elongated channel following member end;

c) elongated channel following member biasing means associated with said second elongated channel following member end; and d) anchoring means for securing said elongated channel following member biasing means and said second elongated channel following member end proximate said receiving aperture formed in said sliding deadblock member.

10. A latch assembly for mounting to a sliding door and engaging with a strike-late means, comprising:

a) a housing for fitting within the sliding door;

b) self-latching deadbolt means associated with said housing for engaging with the strike plate means comprising a deadbolt assembly comprising:

i) a sliding deadbolt member having first and second ends;

ii) a lever having first and second ends;

iii) hooking means associated with said lever first end for engaging the strike plate means, wherein said hooking means comprises a hook formed in said lever proximate said lever first end;

iv) a channel formed within said lever extending from proximate said lever second end towards said lever first end;

v) pivoting means for connecting said lever by said channel to said deadbolt member;

vi) biasing means for providing a variable point of pivoting within said channel whereby said pivoting varies from proximate said lever second end toward said lever first end and wherein said biasing means comprises a spring fitted within said channel that cooperates with said pivoting means; and vii) guide means for aiding in directing the motion of said lever, wherein said guide means comprises:

a guide aperture formed in said lever;

a guide pin that fits within said guide aperture;

a guide pin receiving aperture formed in said deadbolt member which secures said guide pin within said guide aperture;

c) deadbolt extension means associated with said housing for sliding said self-latching deadbolt means between a nonengaging position and an engaging position with the strike plate means; and d) self-retracting finger pull means for accessing said sliding door from within a surrounding framework, wherein said self-retracting finger pull means comprises:

i) a finger pull member having first and second ends;

ii) finger grasping means proximate said finger pull member first end;

iii) self-retraction means within said sliding deadbolt member for providing access to said finger pull member and for retracting said finger pull member; and iv) finger pull attachment means proximate said finger pull member second end for providing a hinged connection to said self-retraction means.

11. A self-latching deadbolt assembly according to claim 10, wherein said self-retraction means comprises:

a) a plunger member fitted within a received aperture formed in said sliding deadbolt member;

b) plunger biasing means coupled between said plunger member and said receiving aperture;

c) a continuous channel formed in said plunger member; and d) channel following means for locking said plunger in a retracted position and for retaining said plunger in an extended position.

12. A latch assembly according to claim 11, wherein said channel following means comprises:

a) an elongated channel following member having first and second ends;

b) a channel following finger formed at said first elongated channel following member end;

c) elongated channel following member biasing means associated with said second elongated channel following member end; and d) anchoring means for securing said elongated channel following member biasing means and said second elongated channel following member end proximate said receiving aperture formed in said sliding deadbolt member.

*13. A latch assembly comprising:*

*a latch housing;*

*a deadbolt slideably positionable in the latch housing; and*

*a pull, coupled to a distal end of the deadbolt and positionable relative to the deadbolt, including a finger pull member and a self retraction mechanism,*

*wherein the self-retraction mechanism includes:*

*a plunger member coupled to the finger pull member and fitted within a receiving aperture formed in the deadbolt;*

*a biasing member coupled between the plunger member and the receiving aperture;*

*a continuous channel formed in the plunger member; and*

*a channel follower coupled to the plunger member for locking the plunger member in a retracted position and for retaining the plunger member in an extended position.*

*14. The latch assembly of claim 13 wherein the pull includes a finger pull member pivotally coupled to the distal end of the deadbolt and rotatably positionable between a stowed position and a use position.*

*15. The latch assembly of claim 14, wherein the finger pull member includes a tab extending therefrom which is received within a slot formed in the distal end of the deadbolt when the finger pull member is in the stowed position.*

*16. The latch assembly of claim 13 wherein the finger pull member is coupled to the plunger member for reciprocating movement relative to the deadbolt.*

*17. The latch assembly of claim 16 wherein the finger pull member is pivotally coupled to a distal end of the plunger member and rotatably positionable between a stowed position and a use position.*

*18. The latch assembly of claim 17 wherein the finger pull member includes a tab extending therefrom which is received within a slot formed in the distal end of the deadbolt when the finger pull member is in the stowed position and the plunger member is in the retracted position.*

*19. A latch assembly comprising:*

*a latch housing;*

*a deadbolt slideably positionable in the latch housing; and*

*a pull, coupled to a distal end of the deadbolt and positionable relative to the deadbolt, including a finger pull member and a self retraction mechanism,*

*wherein the self-retraction mechanism includes:*

*a plunger member coupled to the finger pull member and fitted within a receiving aperture formed in the deadbolt; and*

*a channel follower coupled to the plunger member for locking the plunger member in a retracted position and for retaining the plunger member in an extended position.*

*20. The latch assembly of claim 19, wherein the self-retraction mechanism further comprises a biasing member, coupled between the plunger member and the receiving aperture, for biasing the plunger member towards the extended position.*

*21. The latch assembly of claim 19, wherein the self-retraction mechanism further comprises a continuous channel formed in the plunger member.*

*22. The latch assembly of claim 19, wherein the finger pull member is coupled to the plunger member for reciprocating movement relative to the deadbolt.*

*23. The latch assembly of claim 22, wherein the finger pull member is pivotally coupled to a distal end of the plunger member and rotatably positionable between a stowed position and a use position.*

*24. The latch assembly of claim 23 wherein the finger pull member includes a tab extending therefrom which is received within a slot formed in the distal end of the deadbolt when the finger pull member is in the stowed position and the plunger member is in the retracted position.*

* * * * *